(12) United States Patent
Taylor et al.

(10) Patent No.: US 8,406,119 B2
(45) Date of Patent: Mar. 26, 2013

(54) ADAPTIVE DEVICE-INITIATED POLLING

(75) Inventors: John Louis Taylor, Webster, NY (US); John Thomas Canosa, Spencerport, NY (US)

(73) Assignee: Axeda Acquisition Corporation, Foxboro, MA (US)

( * ) Notice: Subject to any disclaimer, the term of this patent is extended or adjusted under 35 U.S.C. 154(b) by 1194 days.

(21) Appl. No.: 11/537,399

(22) Filed: Sep. 29, 2006

(65) Prior Publication Data

US 2007/0078976 A1    Apr. 5, 2007
US 2007/0288629 A2    Dec. 13, 2007

Related U.S. Application Data

(63) Continuation-in-part of application No. 10/028,126, filed on Dec. 20, 2001, now Pat. No. 7,254,601.

(51) Int. Cl.
*G01R 31/08* (2006.01)
(52) U.S. Cl. .......................... 370/216; 370/449
(58) Field of Classification Search .................. None
See application file for complete search history.

(56) References Cited

U.S. PATENT DOCUMENTS

| | | | |
|---|---|---|---|
| 4,086,434 A | 4/1978 | Bocchi | |
| 4,412,292 A | 10/1983 | Sedam et al. | |
| 4,497,037 A | 1/1985 | Kato et al. | |
| 4,583,834 A | 4/1986 | Seko et al. | |
| 4,853,946 A | 8/1989 | Elliott et al. | |
| 4,962,368 A | 10/1990 | Dobrzanski et al. | |
| 4,964,065 A | 10/1990 | Hicks et al. | |
| 4,965,946 A | 10/1990 | Hegedus et al. | |
| 4,996,703 A | 2/1991 | Gray | |
| 5,038,319 A | 8/1991 | Carter et al. | |
| 5,057,866 A | 10/1991 | Hill, Jr. et al. | |
| 5,061,837 A | 10/1991 | Gilbert et al. | |
| 5,077,582 A | 12/1991 | Kravette et al. | |
| 5,084,875 A | 1/1992 | Weinberger et al. | |
| 5,129,080 A | 7/1992 | Smith | |
| 5,138,377 A | 8/1992 | Smith et al. | |
| 5,163,151 A | 11/1992 | Bronikowski et al. | |
| 5,184,179 A * | 2/1993 | Tarr et al. ....................... | 399/8 |
| 5,204,699 A | 4/1993 | Birnbaum et al. | |
| 5,212,645 A | 5/1993 | Wildes et al. | |
| 5,214,772 A | 5/1993 | Weinberger et al. | |

(Continued)

FOREIGN PATENT DOCUMENTS

| | | |
|---|---|---|
| EP | 0874306 | 10/1998 |
| EP | 1 191 744 | 3/2002 |

(Continued)

OTHER PUBLICATIONS

"Frequently Asked Questions about the Extensible Markup Language—The XML FAQ" Version 1.41 (http://www.oasis-open.org/cover/xmlFAQ141-19981006.html) (Oct. 6, 1998).

(Continued)

*Primary Examiner* — Steven H Nguyen
(74) *Attorney, Agent, or Firm* — Fish & Richardson P.C.

(57) ABSTRACT

A method includes periodically sending a polling call to an enterprise system outside the firewall at a first polling rate during normal operating conditions, monitoring for a fault condition, periodically sending polling calls to the device outside the firewall at a second polling rate when a fault condition is detected, the second polling rate being higher than the first polling rate. The second polling rate is used as result of a fault condition. The method also includes sending a problem report with the polling calls when the fault condition is detected.

35 Claims, 3 Drawing Sheets

U.S. PATENT DOCUMENTS

| | | | |
|---|---|---|---|
| 5,216,461 A | 6/1993 | Maekawa et al. | |
| 5,220,380 A | 6/1993 | Hirata et al. | |
| 5,224,157 A | 6/1993 | Yamada et al. | |
| 5,243,382 A | 9/1993 | Takano et al. | |
| 5,257,069 A | 10/1993 | Hirata et al. | |
| 5,261,061 A | 11/1993 | Ju | |
| 5,270,775 A | 12/1993 | Suzuki | |
| 5,282,127 A | 1/1994 | Mii | |
| 5,291,244 A | 3/1994 | Kajiwara et al. | |
| 5,293,196 A | 3/1994 | Kaneko et al. | |
| 5,297,034 A | 3/1994 | Weinstein | |
| 5,297,256 A | 3/1994 | Wolstenholme et al. | |
| 5,300,980 A | 4/1994 | Maekawa et al. | |
| 5,303,005 A | 4/1994 | Takano et al. | |
| 5,305,055 A | 4/1994 | Ebner et al. | |
| 5,305,199 A | 4/1994 | LoBiondo et al. | |
| 5,307,263 A | 4/1994 | Brown | |
| 5,325,156 A | 6/1994 | Ulinski | |
| 5,333,286 A | 7/1994 | Weinberger et al. | |
| 5,335,048 A | 8/1994 | Takano et al. | |
| 5,339,168 A | 8/1994 | Evanitsky et al. | |
| 5,342,037 A | 8/1994 | Martin | |
| 5,347,346 A | 9/1994 | Shimizu et al. | |
| 5,359,391 A | 10/1994 | Kuroyanagi et al. | |
| 5,361,265 A | 11/1994 | Weinberger et al. | |
| 5,365,310 A | 11/1994 | Jenkins et al. | |
| 5,367,667 A | 11/1994 | Wahlquist et al. | |
| 5,369,469 A | 11/1994 | Leo et al. | |
| 5,369,471 A | 11/1994 | Yamada | |
| 5,369,472 A | 11/1994 | Raj et al. | |
| 5,373,349 A | 12/1994 | Ito | |
| 5,384,622 A | 1/1995 | Hirata et al. | |
| 5,386,271 A | 1/1995 | Maekawa et al. | |
| 5,392,095 A | 2/1995 | Siegel | |
| 5,398,257 A | 3/1995 | Groenteman | |
| 5,404,199 A | 4/1995 | Hirata et al. | |
| 5,412,779 A | 5/1995 | Motoyama | |
| 5,414,494 A | 5/1995 | Aikens et al. | |
| 5,420,667 A | 5/1995 | Kaneko et al. | |
| 5,424,808 A | 6/1995 | Maekawa et al. | |
| 5,424,844 A | 6/1995 | Koyanagi et al. | |
| 5,428,551 A | 6/1995 | Trainor et al. | |
| 5,430,709 A | 7/1995 | Galloway | |
| 5,434,650 A | 7/1995 | Nakahara et al. | |
| 5,442,541 A | 8/1995 | Hube et al. | |
| 5,444,517 A | 8/1995 | Nagashima | |
| 5,444,851 A | 8/1995 | Woest | |
| 5,446,522 A | 8/1995 | Tahara et al. | |
| 5,452,057 A | 9/1995 | Imaizumi et al. | |
| 5,459,552 A | 10/1995 | Ohira | |
| 5,463,775 A | 10/1995 | DeWitt et al. | |
| 5,469,353 A | 11/1995 | Pinsky et al. | |
| 5,485,142 A | 1/1996 | Stute et al. | |
| 5,488,454 A | 1/1996 | Fukada et al. | |
| 5,491,535 A | 2/1996 | Hirata et al. | |
| 5,493,364 A | 2/1996 | Kuroyanagi et al. | |
| 5,517,491 A | 5/1996 | Nanni et al. | |
| 5,528,691 A | 6/1996 | Rosauer et al. | |
| 5,530,899 A | 6/1996 | MacDonald | |
| 5,543,892 A | 8/1996 | Hirata et al. | |
| 5,548,376 A | 8/1996 | Kikuno | |
| 5,550,957 A | 8/1996 | Davidson, Jr. et al. | |
| 5,555,191 A | 9/1996 | Hripcsak | |
| 5,561,501 A | 10/1996 | Honma | |
| 5,572,672 A | 11/1996 | Dewitt et al. | |
| 5,579,087 A | 11/1996 | Salgado | |
| 5,586,254 A | 12/1996 | Kondo et al. | |
| 5,594,529 A | 1/1997 | Yamashita et al. | |
| 5,600,301 A | 2/1997 | Robinson, III | |
| 5,600,403 A | 2/1997 | Inoo | |
| 5,603,060 A | 2/1997 | Weinberger et al. | |
| 5,603,323 A | 2/1997 | Pflugrath et al. | |
| 5,619,024 A | 4/1997 | Kolls | |
| 5,619,716 A | 4/1997 | Nonaka et al. | |
| 5,631,724 A | 5/1997 | Sawada et al. | |
| 5,636,008 A | 6/1997 | LoBiondo et al. | |
| 5,636,333 A | 6/1997 | Davidson, Jr. et al. | |
| 5,638,427 A | 6/1997 | Flemming et al. | |
| 5,640,495 A | 6/1997 | Colbert et al. | |
| 5,642,202 A | 6/1997 | Williams et al. | |
| 5,642,208 A | 6/1997 | Takahashi et al. | |
| 5,655,084 A | 8/1997 | Pinsky et al. | |
| 5,659,794 A | 8/1997 | Caldarale et al. | |
| 5,673,190 A | 9/1997 | Kahleck et al. | |
| 5,675,744 A | 10/1997 | Tsujii | |
| 5,677,775 A | 10/1997 | Yamaguchi et al. | |
| 5,694,528 A | 12/1997 | Hube | |
| 5,696,903 A | 12/1997 | Mahany | |
| 5,699,494 A | 12/1997 | Colbert et al. | |
| 5,708,908 A | 1/1998 | Hirata et al. | |
| 5,708,909 A | 1/1998 | Yamashita et al. | |
| 5,715,393 A | 2/1998 | Naugle | |
| 5,715,496 A | 2/1998 | Sawada et al. | |
| 5,715,823 A | 2/1998 | Wood et al. | |
| 5,720,015 A | 2/1998 | Martin et al. | |
| 5,727,135 A | 3/1998 | Webb et al. | |
| 5,727,248 A | 3/1998 | Ogura | |
| 5,732,212 A | 3/1998 | Perholz et al. | |
| 5,736,965 A | 4/1998 | Mosebrook et al. | |
| 5,740,801 A | 4/1998 | Branson | |
| 5,745,268 A | 4/1998 | Eastvold et al. | |
| 5,748,892 A | 5/1998 | Richardson | |
| 5,748,907 A | 5/1998 | Crane | |
| 5,752,125 A | 5/1998 | Yamashita et al. | |
| 5,752,128 A | 5/1998 | Yamashita | |
| 5,752,917 A | 5/1998 | Fuchs | |
| 5,761,529 A | 6/1998 | Raji et al. | |
| 5,764,918 A | 6/1998 | Poulter | |
| 5,768,516 A | 6/1998 | Sugishima | |
| 5,772,585 A | 6/1998 | Lavin et al. | |
| 5,774,052 A | 6/1998 | Hamm et al. | |
| 5,786,994 A | 7/1998 | Friz et al. | |
| 5,787,149 A | 7/1998 | Yousefi et al. | |
| 5,787,278 A | 7/1998 | Barton et al. | |
| 5,790,793 A | 8/1998 | Higley | |
| 5,790,977 A | 8/1998 | Exekiel | |
| 5,798,738 A | 8/1998 | Yamada | |
| 5,801,964 A | 9/1998 | McCarthy | |
| 5,809,237 A | 9/1998 | Watts et al. | |
| 5,812,397 A | 9/1998 | Pech et al. | |
| 5,812,874 A | 9/1998 | Yamashita et al. | |
| 5,818,603 A | 10/1998 | Motoyama | |
| 5,819,015 A | 10/1998 | Martin et al. | |
| 5,819,110 A | 10/1998 | Motoyama | |
| 5,822,221 A | 10/1998 | Groenteman | |
| 5,826,027 A | 10/1998 | Pedersen et al. | |
| 5,828,943 A | 10/1998 | Brown | |
| 5,835,816 A | 11/1998 | Sawada et al. | |
| 5,835,911 A | 11/1998 | Nakagawa et al. | |
| 5,844,550 A | 12/1998 | Trainor et al. | |
| 5,845,061 A | 12/1998 | Miyamoto et al. | |
| 5,845,230 A | 12/1998 | Lamberson | |
| 5,857,207 A | 1/1999 | Lo et al. | |
| 5,857,967 A | 1/1999 | Frid et al. | |
| 5,862,348 A | 1/1999 | Pedersen | |
| 5,862,404 A | 1/1999 | Onaga | |
| 5,865,745 A | 2/1999 | Schmitt et al. | |
| 5,872,635 A | 2/1999 | Akiyama | |
| 5,872,928 A | 2/1999 | Lewis et al. | |
| 5,873,009 A | 2/1999 | Yamashita et al. | |
| 5,873,659 A | 2/1999 | Edwards et al. | |
| 5,878,746 A | 3/1999 | Lemelson et al. | |
| 5,880,677 A | 3/1999 | Lestician | |
| 5,884,072 A | 3/1999 | Rasmussen | |
| 5,887,216 A * | 3/1999 | Motoyama | 399/8 |
| 5,890,029 A | 3/1999 | Hirata et al. | |
| 5,894,416 A | 4/1999 | Kuroyanagi et al. | |
| 5,897,235 A | 4/1999 | Honma | |
| 5,901,286 A | 5/1999 | Danknick et al. | |
| 5,905,906 A | 5/1999 | Goffinet et al. | |
| 5,909,493 A | 6/1999 | Motoyama et al. | |
| 5,911,095 A | 6/1999 | Atsumi et al. | |
| 5,913,060 A | 6/1999 | Discavage | |
| 5,917,405 A | 6/1999 | Joao | |
| 5,923,842 A | 7/1999 | Pedersen et al. | |
| 5,933,675 A | 8/1999 | Sawada et al. | |
| 5,935,060 A | 8/1999 | Iliff | |

| Patent | Kind | Date | Inventor |
|---|---|---|---|
| 5,941,949 | A | 8/1999 | Pedersen |
| 5,956,487 | A | 9/1999 | Venkatraman et al. |
| 5,956,698 | A | 9/1999 | Lacheze et al. |
| 5,961,586 | A | 10/1999 | Pedersen |
| 5,968,116 | A | 10/1999 | Day et al. |
| 5,970,149 | A | 10/1999 | Johnson |
| 5,974,234 | A | 10/1999 | Levine et al. |
| 5,975,737 | A | 11/1999 | Crater et al. |
| 5,991,810 | A | 11/1999 | Shapiro et al. |
| 6,003,061 | A | 12/1999 | Jones et al. |
| 6,003,070 | A | 12/1999 | Frantz |
| 6,003,078 | A | 12/1999 | Kodimer et al. |
| 6,006,045 | A | 12/1999 | Miyawaki |
| 6,009,274 | A | 12/1999 | Fletcher et al. |
| 6,009,284 | A | 12/1999 | Weinberger et al. |
| 6,012,088 | A | 1/2000 | Li et al. |
| 6,014,631 | A | 1/2000 | Teagarden et al. |
| 6,014,691 | A | 1/2000 | Brewer et al. |
| 6,014,694 | A | 1/2000 | Aharoni et al. |
| 6,016,535 | A | 1/2000 | Krantz et al. |
| 6,021,284 | A | 2/2000 | Serizawa et al. |
| 6,022,315 | A | 2/2000 | Iliff |
| 6,023,223 | A | 2/2000 | Baxter, Jr. |
| 6,023,507 | A | 2/2000 | Wookey |
| 6,023,721 | A | 2/2000 | Cummings |
| 6,023,749 | A | 2/2000 | Richardson |
| 6,025,925 | A | 2/2000 | Davidson, Jr. et al. |
| 6,031,964 | A | 2/2000 | Anderson |
| 6,041,041 | A | 3/2000 | Ramanathan et al. |
| 6,042,111 | A | 3/2000 | Rivers et al. |
| 6,057,857 | A | 5/2000 | Bloomfield |
| 6,060,994 | A | 5/2000 | Chen |
| 6,061,603 | A | 5/2000 | Papadopolous et al. |
| 6,064,915 | A | 5/2000 | Kaneko et al. |
| 6,065,118 | A | 5/2000 | Bull et al. |
| 6,081,623 | A | 6/2000 | Bloomfield et al. |
| 6,088,718 | A | 7/2000 | Altschuler et al. |
| 6,091,915 | A | 7/2000 | Takagishi |
| 6,098,116 | A | 8/2000 | Nixon et al. |
| 6,101,407 | A | 8/2000 | Groezinger |
| 6,108,492 | A | 8/2000 | Miyachi |
| 6,112,035 | A | 8/2000 | Kuroyanagi et al. |
| 6,112,256 | A | 8/2000 | Goffinet et al. |
| 6,115,489 | A | 9/2000 | Gupta et al. |
| 6,118,899 | A | 9/2000 | Bloomfield et al. |
| 6,119,934 | A | 9/2000 | Kolls |
| 6,122,463 | A | 9/2000 | Nagatani |
| 6,125,363 | A | 9/2000 | Buzzeo et al. |
| 6,130,999 | A | 10/2000 | Serizawa et al. |
| 6,139,177 | A | 10/2000 | Venkatraman et al. |
| 6,141,737 | A | 10/2000 | Krantz et al. |
| 6,152,365 | A | 11/2000 | Kolls |
| 6,157,944 | A | 12/2000 | Pedersen |
| 6,161,145 | A | 12/2000 | Bainbridge |
| 6,167,432 | A | 12/2000 | Jiang |
| 6,167,448 | A | 12/2000 | Hemphill et al. |
| 6,172,683 | B1 | 1/2001 | Bloomfield |
| 6,175,866 | B1 | 1/2001 | Holloway et al. |
| 6,181,331 | B1 | 1/2001 | Trainor et al. |
| 6,189,113 | B1 | 2/2001 | Rabb et al. |
| 6,196,735 | B1 | 3/2001 | Inamine |
| 6,205,466 | B1 | 3/2001 | Karp et al. |
| 6,209,048 | B1 | 3/2001 | Wolff |
| 6,221,011 | B1 | 4/2001 | Bardy |
| 6,226,650 | B1 | 5/2001 | Mahajan et al. |
| 6,230,199 | B1 | 5/2001 | Revashetti et al. |
| 6,246,485 | B1 | 6/2001 | Brown et al. |
| 6,256,378 | B1 | 7/2001 | Iggulden et al. |
| 6,256,668 | B1 | 7/2001 | Slivka et al. |
| 6,260,148 | B1 | 7/2001 | Aggarwal et al. |
| 6,260,248 | B1 | 7/2001 | Cramer et al. |
| 6,282,454 | B1 | 8/2001 | Papadopolous et al. |
| 6,282,711 | B1 | 8/2001 | Halpern et al. |
| 6,286,038 | B1 | 9/2001 | Reichmeyer et al. |
| 6,286,059 | B1 | 9/2001 | Sugiura |
| 6,289,461 | B1 | 9/2001 | Dixon |
| 6,292,828 | B1 | 9/2001 | Williams |
| 6,295,527 | B1 | 9/2001 | McCormack et al. |
| 6,298,457 | B1 | 10/2001 | Rachlin et al. |
| 6,304,895 | B1 | 10/2001 | Schneider et al. |
| 6,307,570 | B1 | 10/2001 | Stergiades |
| 6,308,099 | B1 | 10/2001 | Fox et al. |
| 6,311,024 | B1 | 10/2001 | Serizawa et al. |
| 6,312,378 | B1 | 11/2001 | Bardy |
| 6,317,570 | B1 | 11/2001 | Uchida et al. |
| 6,317,783 | B1 | 11/2001 | Freishtat et al. |
| 6,317,848 | B1 | 11/2001 | Sorens et al. |
| 6,325,540 | B1 | 12/2001 | Lounsberry et al. |
| 6,327,594 | B1 | 12/2001 | Van Huben et al. |
| 6,338,086 | B1 | 1/2002 | Curtis et al. |
| 6,343,320 | B1 | 1/2002 | Fairchild et al. |
| 6,356,933 | B2 | 3/2002 | Mitchell et al. |
| 6,356,949 | B1 | 3/2002 | Katsandres et al. |
| 6,366,741 | B1 | 4/2002 | Fukushima |
| 6,368,284 | B1 | 4/2002 | Bardy |
| 6,370,552 | B1 | 4/2002 | Bloomfield |
| 6,370,570 | B1 | 4/2002 | Muir et al. |
| 6,370,582 | B1 | 4/2002 | Lim et al. |
| 6,377,162 | B1 | 4/2002 | Delestienne et al. |
| 6,377,971 | B1 | 4/2002 | Madden et al. |
| 6,381,557 | B1 | 4/2002 | Babula et al. |
| 6,397,212 | B1 | 5/2002 | Biffar |
| 6,405,310 | B1 | 6/2002 | Simpson |
| 6,406,426 | B1 | 6/2002 | Reuss et al. |
| 6,412,026 | B1 | 6/2002 | Graf |
| 6,415,023 | B2 | 7/2002 | Iggulden |
| 6,415,392 | B1 | 7/2002 | Suzuki et al. |
| 6,421,671 | B1 | 7/2002 | Bryan et al. |
| 6,426,798 | B1 | 7/2002 | Yeung |
| 6,430,612 | B1 | 8/2002 | Iizuka |
| 6,430,711 | B1 | 8/2002 | Sekizawa |
| 6,434,572 | B2 | 8/2002 | Derzay et al. |
| 6,437,692 | B1 | 8/2002 | Petite et al. |
| 6,437,803 | B1 | 8/2002 | Panasyuk et al. |
| 6,438,598 | B1 | 8/2002 | Pedersen |
| 6,446,192 | B1 | 9/2002 | Narasimhan et al. |
| 6,449,633 | B1 | 9/2002 | Van et al. |
| 6,449,663 | B1 * | 9/2002 | Carney et al. .................. 710/15 |
| 6,453,127 | B2 | 9/2002 | Wood et al. |
| 6,453,129 | B1 | 9/2002 | Simpson et al. |
| 6,457,038 | B1 | 9/2002 | Defosse |
| 6,462,831 | B1 | 10/2002 | Akiyama |
| 6,466,971 | B1 | 10/2002 | Humpleman et al. |
| 6,471,521 | B1 | 10/2002 | Dornbush et al. |
| 6,477,117 | B1 | 11/2002 | Narayanaswami et al. |
| 6,479,792 | B1 | 11/2002 | Beiermann et al. |
| 6,487,513 | B1 | 11/2002 | Eastvold et al. |
| 6,493,517 | B1 | 12/2002 | Hanson |
| 6,493,871 | B1 | 12/2002 | McGuire et al. |
| 6,494,831 | B1 | 12/2002 | Koritzinsky |
| 6,510,350 | B1 | 1/2003 | Steen et al. |
| 6,523,013 | B2 | 2/2003 | Shah et al. |
| 6,523,063 | B1 | 2/2003 | Miller et al. |
| 6,523,130 | B1 | 2/2003 | Hickman et al. |
| 6,529,848 | B2 | 3/2003 | Sone |
| 6,538,667 | B1 | 3/2003 | Duursma et al. |
| 6,549,612 | B2 | 4/2003 | Gifford et al. |
| 6,553,336 | B1 | 4/2003 | Johnson et al. |
| 6,553,490 | B1 | 4/2003 | Kottapurath et al. |
| 6,559,965 | B1 | 5/2003 | Simpson et al. |
| 6,560,611 | B1 | 5/2003 | Nine et al. |
| 6,560,641 | B1 | 5/2003 | Powderly et al. |
| 6,560,656 | B1 | 5/2003 | O'Sullivan et al. |
| 6,564,227 | B2 | 5/2003 | Sakakibara et al. |
| 6,567,813 | B1 | 5/2003 | Zhu et al. |
| 6,574,729 | B1 | 6/2003 | Fink et al. |
| 6,581,092 | B1 | 6/2003 | Motoyama et al. |
| 6,581,094 | B1 | 6/2003 | Gao |
| 6,587,812 | B1 | 7/2003 | Takayama |
| 6,587,879 | B1 | 7/2003 | Reynolds |
| 6,591,272 | B1 | 7/2003 | Williams |
| 6,598,011 | B1 | 7/2003 | Koritzinsky et al. |
| 6,601,087 | B1 | 7/2003 | Zhu et al. |
| 6,601,159 | B1 | 7/2003 | Smith et al. |
| 6,604,212 | B2 | 8/2003 | Sekizawa et al. |
| 6,609,108 | B1 | 8/2003 | Pulliam et al. |
| 6,611,863 | B1 | 8/2003 | Banginwar |
| 6,631,407 | B1 | 10/2003 | Mukaiyama et al. |

| | | |
|---|---|---|
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,695 B2 | 12/2003 | McFadden |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zdankin et al. |
| 6,763,274 B1 | 7/2004 | Gilbert |
| 6,763,501 B1 | 7/2004 | Zhu et al. |
| 6,766,333 B1 | 7/2004 | Wu et al. |
| 6,775,238 B1 | 8/2004 | Suzuki et al. |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 * | 10/2004 | Kracht ................. 709/223 |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B1 | 2/2006 | Bahl |
| 7,016,966 B1 | 3/2006 | Saulpaugh et al. |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,085,824 B2 | 8/2006 | Forth et al. |
| 7,089,567 B2 | 8/2006 | Giradot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,799 B2 | 9/2006 | Dixon |
| 7,113,988 B2 | 9/2006 | Chirashya et al. |
| 7,116,681 B1 | 10/2006 | Hovell et al. |
| 7,117,239 B1 | 10/2006 | Hansen |
| 7,117,243 B2 | 10/2006 | Peart |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,149,792 B1 | 12/2006 | Hansen |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,253 B1 | 4/2008 | Zhao |
| 7,359,953 B2 | 4/2008 | Muir et al. |
| 7,376,695 B2 | 5/2008 | Duursma et al. |
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |
| 7,496,097 B2 | 2/2009 | Rao et al. |
| 7,502,726 B2 | 3/2009 | Panasyuk et al. |
| 7,502,784 B2 | 3/2009 | Collins |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |

| | | |
|---|---|---|
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,937,370 B2 | 5/2011 | Hansen |
| 7,966,418 B2 | 6/2011 | Shedrinsky |
| 8,055,758 B2 | 11/2011 | Hansen |
| 8,060,886 B2 | 11/2011 | Hansen |
| 8,108,543 B2 | 1/2012 | Hansen |
| 2001/0007117 A1 | 7/2001 | Cooper et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka et al. |
| 2001/0056547 A1 | 12/2001 | Dixon |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 * | 10/2002 | Spicer et al. ............ 709/321 |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063119 A1 | 4/2003 | Bloomfield et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0118353 A1 | 6/2003 | Baller |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027373 A1 | 2/2004 | Jacquot et al. |
| 2004/0027376 A1 | 2/2004 | Calder et al. |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0119930 A1 | 6/2005 | Simon |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |
| 2006/0069662 A1 | 3/2006 | Laborczfalvi et al. |
| 2006/0069668 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri et al. |
| 2006/0159432 A1 | 7/2006 | Mazzaferri et al. |
| 2006/0159555 A1 | 7/2006 | Mazzaferri et al. |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |

| | | |
|---|---|---|
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shabazi et al. |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0063149 A1 | 3/2008 | West et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock et al. |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0143970 A1 | 6/2012 | Hansen |
| 2012/0158914 A1 | 6/2012 | Hansen |
| 2012/0158982 A1 | 6/2012 | Hansen |

FOREIGN PATENT DOCUMENTS

| | | |
|---|---|---|
| EP | 1 362 282 | 11/2003 |
| EP | 1 695 485 | 8/2006 |
| FR | 2797728 | 2/2001 |
| GB | 2305820 | 4/1997 |
| JP | 60-263162 | 12/1985 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |
| JP | 10-190922 | 7/1998 |
| JP | 10-224372 | 8/1998 |
| JP | 11-045195 | 2/1999 |
| JP | 11-203079 | 7/1999 |
| JP | 11-296453 | 10/1999 |
| JP | 2000-112863 | 4/2000 |
| JP | 2000-122952 | 4/2000 |
| JP | 2000-163283 | 6/2000 |
| JP | 2000-278773 | 10/2000 |
| JP | 2000-309145 | 11/2000 |
| JP | 2001-337817 | 12/2001 |
| JP | 2003-223603 | 8/2003 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO99/57837 | 11/1999 |
| WO | WO99/57838 | 11/1999 |
| WO | WO99/64958 | 12/1999 |
| WO | WO00/23894 | 4/2000 |
| WO | WO02/10919 | 2/2002 |
| WO | WO02/25501 | 3/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | 2003021464 | 3/2003 |
| WO | WO03/021464 | 3/2003 |
| WO | WO03/054439 | 7/2003 |
| WO | 2004059447 | 7/2004 |
| WO | WO2004/059447 | 7/2004 |
| WO | WO2006/009402 | 1/2006 |
| WO | WO97/30879 | 1/2007 |
| WO | WO2008/083177 | 7/2008 |

OTHER PUBLICATIONS

24×7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL:http://www.ghs.com/partners/allegro/> [retrieved on Jun. 10, 2002] the whole document.
Allegro, RomWebCLient Embedded HTTP client Toolkit: Allegrosoft, Circuit Cellar Online, Sep. 7, 2000, pp. 1-2, XP-002201983, URL:http://web.archive.orgweb/20000709204234/http://www.allegrosoft.com/romwebclient.html.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 2001).
Eastvold, Roger, "Services: The Next Generation," The Professional Journal, vol. 20, No. 4.
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from the Internet:<URL:http://www.cs.dartmouth.edu/~makedon/cs188/proposal.html>, [retrieved Feb. 15, 2005].
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1998).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).
EmWare Press Release: "emWare Delivers EMIT 3.0 SDK Pro-A Complete Device Networking Kit for Developing End-to-end, Embedded Device Networking Solutions," Salt Lake City, UT (May 1999).
EmWare Press Release: "emWare, IBM Demonstrate Next Phase in Establishing Worldwide Access to Embedded Devices," Chicago, IL (Mar. 1999).
EmWare Press Release: "emWare's emLink (TM) Used to Internet-enable Welch Allyn's Vital Signs Monitor," Chicago, IL (Mar. 1999).
EmWare Press Release: "Invensys Selects emWare EMIT Device-Networking Software to Add Remote Monitoring and Control Capabilities to its Controller Products," Salt Lake City, UT (Jun. 1999).
EmWare Press Release: "Motorola, Mitsubishi and National Semiconductor Join emWare's Embed the Internet Alliance," Chicago, IL (Mar. 1999).
Franklin, M. et al., "Data in Your Face: PUSH Technology in Perspective", Proc. ACM SIGMOD Int'l Conf. on Mgmt of Data, (Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet:<URL:http://www.upnp.org/specs/arch/upnpda10_20000613.htm>, [retrieved on Nov. 24, 2008].
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet:<URL:http://www.intelligententerprise.com/010416/webhouse1_1.jhtml> [retrieved on Nov. 24, 2008] (Apr. 16, 2001).
Koppen, E., et al., "Active Hypertext for Distributed Web Applications", Enabling Technologies: Infrastructure for Collaborative Enterprises, (WET ICE '99), Proc. IEEE 8th Int'l. Workshop (1999), pp. 297-302.
Kovar, J., "Xerox Unveils Expanded Channel Lineup; Also Plans to Introduce E-Mail, Queue Management Software," PC Expo,(Jun. 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n 12; (Dec. 1975), pp. 636-638 (English Abstract).
Layman, et al., "XML-Data," Position Paper from Microsoft Corp. (Jun. 1997), [online] Retrieved from the Internet:<URL:http://www.oasis-open.org/cover/xml-data9706223.html> [retrieved on Sep. 2, 2004].
Lerner, R., "At the Forge: Introducing SOAP", Linux Journal, #XP002292162 (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Protessional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet:<URL:http://www.w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet:<URL:http://www.mecca.org/~ltague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R. "XML Tutorials for Programmers: Tutorial 2: Writing XML Documents," (1999) [online] Retrieved from the Internet:<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
Rytting, T., "Dispensing the Goods, Embedded Style," Circuit Cellar Online, (Oct. 1999).
Schmidt, The Evolution of Workflow Standards, IEEE (1999).

SOAP Archives Online, "Multiple Method Calls in SOAP Packer"; [online] Retrieved from the Internet:<URL:http://discuss.develop.com/archives/wa.exe?A2=ind9912&L=soap&T=O&F=&S=&P=25113>, [retrieved on Dec. 8, 2000].
Steinfeld, E., "From Standalone to Internet Appliance", Circuit Cellar Online, [online] (Jul. 9, 2000), #XP002201938, Retrieved from the Internet:<URL:http://web.archive.org/web/20000709204234/http://www.alegrosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 242-28, Jul. 2000.
Searls, "The Next Bang: The Expolosive Combination of Embedded Linux, XML, and Instant Mess.", ACM (Sep. 2000) Issue 77 [online] Retrieved from the Internet:<URL:http://www.linuxjournal.com/article.php?sid=4195>, [retrieved on Nov. 20, 2001].
The Simple Times, vol. 7, No. 1, Mar. 1999; [online] Retrieved from the Internet:<URL:http://www.simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Virtual Reality Transfer Protocol (VRTP); Retrieved from the Internet:<URL:http://www.stl.nps.navy.mil/~brutzman/vrtp> (1998).
Walsh, Norman, "XSL The Extensible Style Language: Styling XML Documents," New Architect Daily, Jan. 1999.
Webmethods B2B Whitepaper; [online] Retrieved from the Internet:<URL:http://www.cs.wisc.edu/~vganti/papers/b2b_wpB2Bintegration.html> (1999).
White Paper, Medical Imaging, East Providence, RI (Sep. 1995).
Wigget, Jeremy, "Intraview: Roger Eastvold of Orasis Inc.," 24x7, Nov. 1996.
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 11, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability in Application No. PCT/US2007/088858, dated Jul. 9, 2009.
Application and Response History in U.S. Appl. No. 09/627,201 as retrieved from PAIR on Apr. 22, 2009.
Application and Response History in U.S. Appl. No. 10/805,012 as retrieved from PAIR on Apr. 22, 2009.
Action and Response History in U.S. Appl. No. 09/667,737 as retrieved from PAIR on Apr. 22, 2009.
Application and Response History in U.S. Appl. No. 11/677,279, as retrieved from PAIR on Jul. 7, 2009.
Application and Response History in U.S. Appl. No. 09/716,717, as retrieved from PAIR on Apr. 22, 2009.
Action and Response History in U.S. Appl. No. 09/708,384 as retrieved from PAIR on Apr. 22, 2009.
Action and Response History in U.S. Appl. No. 11/503,638 as retrieved from PAIR on May 28, 2009.
Action and Response History in U.S. Appl. No. 10/123,960, as retrieved from PAIR on Apr. 22, 2009.
Action and Response History in U.S. Appl. No. 10/124,181, as retrieved from PAIR on Apr. 22, 2009.
Action and Response History in U.S. Appl. No. 10/784,138, as retrieved from PAIR on Apr. 22, 2009.
Action and Response History in U.S. Appl. No. 10/028,126 as retrieved from PAIR, through Feb. 19, 2009.
Action and Response History in U.S. Appl. No. 11/538,402 as retrieved from PAIR, through Jul. 7, 2009.
Machine Translation of Japanese Application No. 2000-122952, published Apr. 2000.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9.
Oral Proceeding Minutes with European Application No. 01955993.9.
Communication dated Apr. 26, 2005 in European Application No. 01955993.9.
Action and Response History in U.S. Appl. No. 10/784,138, as retrieved from PAIR on Aug. 26, 2009.
Action and Response History in U.S. Appl. No. 11/677,279, as retrieved from PAIR on Nov. 13, 2009.
Action and Response History in U.S. Appl. No. 11/503,638 as retrieved from PAIR on Nov. 13, 2009.
Action and Response History in U.S. Appl. No. 10/124,181, as retrieved from PAIR on Nov. 13, 2009.
Action and Response History in U.S. Appl. No. 11/538,402 as retrieved from PAIR, through Nov. 13, 2009.
Action and Response History in U.S. Appl. No. 11/774,474 as retrieved from PAIR, through Sep. 22, 2009.
International Search Report in Application No. PCT/US2002/040058, dated Nov. 3, 2003.
International Preliminary Examination Report in Application No. PCT/US2002/040058, dated Jun. 10, 2004.

Defense Information Systems Agency, Field Services Office, White Paper Report "pcAnywhere 10.5" (Sep. 2003).
Search Report in EP Application No. 02792391.1, dated Nov. 19, 2009.
Office Action in U.S. Appl. No. 13/329,928, dated Apr. 27, 2012.
Final Decision for Rejection in Japanese Patent Application No. 2002-515578, dated Jul. 10, 2012.
Action and Response History in U.S. Appl. No. 11/774,474.
Action and Response History in U.S. Appl. No. 13/329,928.
Examination Report in EP Application No. 02792391.1, dated Feb. 27, 2012.
Machine Translation of Japanese Patent Publication No. 11-045195, (Pub Date Feb. 1999).
Machine Translation of Japanese Patent Publication No. 2000-163283, (Pub Date Jun. 2000).
Oral Proceedings Communication in Application No. EP01973431.8, dated May 12, 2011.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Action and Response History in U.S. Appl. No. 11/677,279.
Action and Response History in U.S. Appl. No. 11/673,943.
Action and Response History in U.S. Appl. No. 10/124,181.
Action and Response History in U.S. Appl. No. 10/784,138.
Action and Response History in U.S. Appl. No. 11/538,402.
Wikipedia, "GoToMyPC", [online] Retrieved from the Internet<URL: http://en.wikipedia.org/wiki/Gotomypc> [retrieved on Jan. 1, 2010] (2010).
Citrix Online, Citrix Systems, Inc. Whilte Paper, "GoToMyPC Security", [online] Retrieved from the Internet: <URL:http://www.citrix.it/REPOSITORY/docRepository/id_979_1124821417888736.pdf> [retrieved on Mar. 16, 2010] (2004).
Citrix Online, Citrix Systems, Inc. Whilte Paper, "GoToMyPC Corporate Technology", [online] Retrieved from the Internet: <URL:http://www.gotomypc.com/downloads/pdf/m/GoToMyPC_Corporate_Technology_White_Paper.pdf> [retrieved on Mar. 16, 2010] (2004).
ExpertCity, Inc., Whilte Paper, "GoToMyPC: Making Life Simpler for Teleworkers and Travelers", [online] Retrieved from the Internet: <URL:http://www.si.umich.edu/Classes/540/Placement/GoOvrvew.pdf> [retrieved on Mar. 16, 2010] (2001).
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Action and Response History in U.S. Appl. No. 11/616,136.
Summons to attend Oral Proceedings in counterpart EP Application No. 01973431.8, dated Feb. 2, 2011.
Second Auxiliary Response in EP Application No. 01973431.8, dated Apr. 26, 2011.
Action and Response History in U.S. Appl. No. 11/503,638.
Examination Report in EP Application No. 01973431.8, dated Mar. 23, 2010.
Examination Report in EP Application No. 02792391.1, dated Mar. 10, 2010.
International Search Report &. Written Opinion in Application No. PCT/US2007/088858, dated May 21, 2008.

* cited by examiner

ADAPTIVE DEVICE-INITIATED POLLING

This application is a continuation-in-part of U.S. application Ser. No. 10/028,126 filed Dec. 20, 2001 which is hereby incorporated by reference in its entirety.

BACKGROUND

1. Field of the Art

The present disclosure generally relates to management of devices having a microprocessor and, more particularly, to management systems including adaptive device-initiated polling.

2. Background and Relevant Art

Remote connectivity to equipment in the field has become a common practice for many Original Equipment Manufacturers (OEMs). The equipment is frequently distributed over a broad geographical region and often involves hundreds if not thousands or tens of thousands of individual devices. A centralized server system is often used to provide connectivity between the OEMs and the equipment. This connectivity allows the OEM to be much faster in resolving problems with the equipment, in part at least because a centralized server system allows the OEM to manage the devices from one or a few locations rather than at the site of each piece of equipment. Such an approach allows the OEMs to be more proactive in preventing problems or be more proactive in addressing problems before they become serious. Remote connectivity also enables OEMs to provide many new value added services, such as automatic consumables replenishment to their customers.

One very common hurdle that companies wishing to deploy remotely connected devices face is the network infrastructure that is deployed at the customer site. Security measures such as firewalls and Internet proxies as well as common IT infrastructure mechanisms such as Network Address Translation (NAT) represent a barrier for direct connectivity to the equipment. In particular, to provide direct connections between all the equipment and the centralized server system would often be prohibitively expensive. As a result, many approaches have been proposed that involve use of the Internet or other global area networks. One difficulty with such approaches is that security measures frequently block access to on-site devices by external systems.

A common technique for overcoming this barrier is to use device initiated polling. A device performing device-initiated polling typically resides within a firewall. The device sends a polling call to a system that is outside the firewall. An initial polling call often identifies the device and includes any number of parameters from the device, such as consumable levels, operating statistics, or other information. When the external system receives a polling call from the device, the external system services the call and sends a reply back to the device inside the firewall. The reply may include a request that the polling device return additional information back to the polling device during a later polling period. By sending the request from within the firewall, a two-way connection is opened through the firewall between the device inside the firewall and the external system. Frequently, when the external system seeks to initiate contact with the device without first having received a request from the device, the firewall disallows the contact.

Current techniques frequently use a pre-set polling rate that may be changed by a user with appropriate permissions. Users are presented with a challenging decision between bandwidth utilization and responsiveness of the device. If the polling rate is set too low, a user may have to wait up to the entire polling period in order to contact the device to begin performing diagnostics or data capture. If the polling rate is set too high, the device is responsive, but may use too much enterprise system bandwidth adding to the ongoing telecommunications cost of the system and posing scalability problems as the number of devices grows.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method is provided herein that includes periodically sending a polling call to an enterprise system outside the firewall at a first polling rate during normal operating conditions, monitoring for a fault condition, periodically sending polling calls to the device outside the firewall at a second polling rate when a fault condition is detected, the second polling rate being higher than the first polling rate. The second polling rate is the result of a fault condition. The method also includes sending a problem report with the polling calls when the fault condition is detected.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The present system and method provides a mechanism for a remotely monitored device to dynamically adjust the rate at which the device initiates a connection to its enterprise based on condition within the device or through device operator assistance. For example, a device may be configured to normally contact an enterprise system once a day. However, if a fault condition is detected within or signaled by the device, the polling rate would automatically be adjusted to an increased rate for an increased period. In addition to increasing the polling rate, the device also sends a problem report to the enterprise system. The enterprise system then notifies a service technician and/or customer service agent that a fault condition has occurred and that the device is requesting service. As a result, the service technician provides rapid notification that the device has encountered a fault condition, rather than having to wait until the end of the polling period. This rapid notification is provided while minimizing the bandwidth used by the device to communicate with the enterprise system during periods when the device is not encountering a fault condition.

Additionally, when the service technician begins to diagnose and address the fault condition, the device is polling at increased rate. The increased polling rate allows the technician to receive quicker responses from the device. Specifically, the length of each polling period is decreased with an increased polling rate because the device sends polling calls more frequently. As a result, the time the service technician waits for responses from the device between polling periods is decreased with an increased polling rate. Thus, the system is also more responsive when the service technician is working to address the fault condition.

Further, the enterprise system may be configured to respond to the problem report. For example, the enterprise system may include a server or servers that receives the problem report and automatically responds to the device with instructions to the device, such as instructions to diagnose and/or remedy the fault condition.

Figure 1:
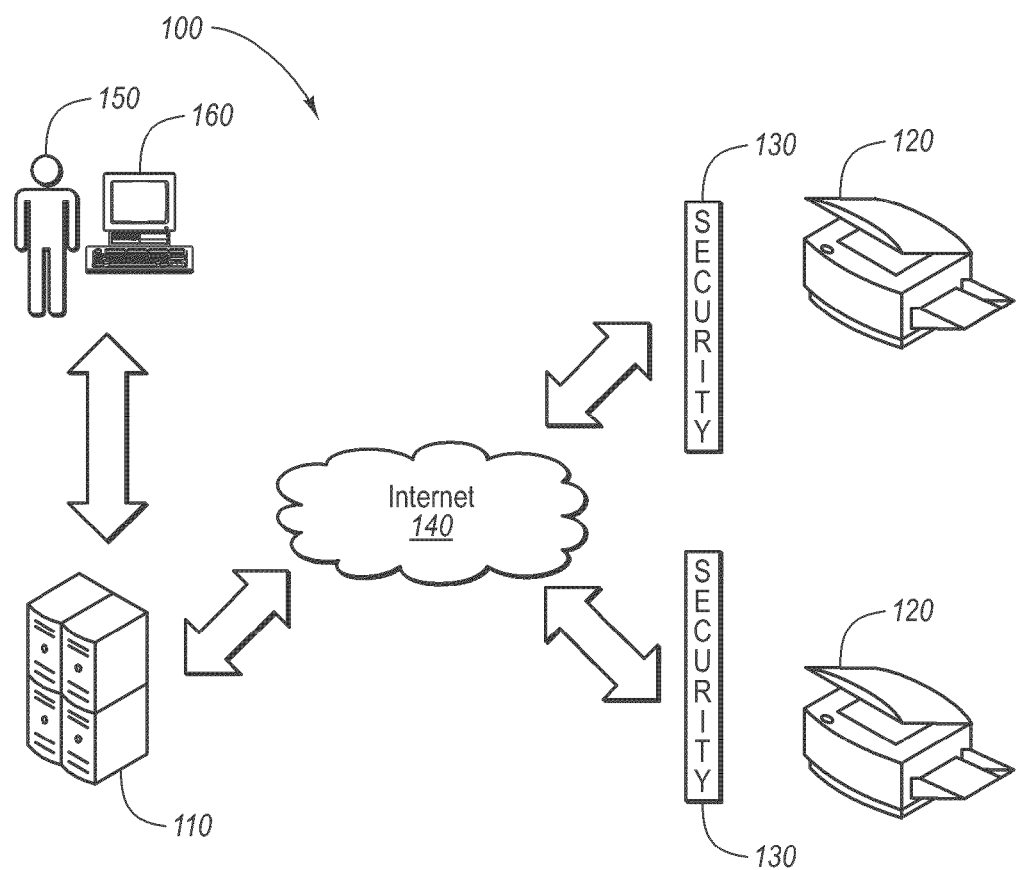
FIG. 1 illustrates a system having distributed assets able to perform adaptive device initiated polling according to one example.

FIG. 1 illustrates a schematic view of a system 100 that includes an enterprise system 110 that is used to manage a number of devices 120 using a network, such as the Internet or a global computer network. The devices 120 each include a microprocessor based system that autonomously and regularly initiates a connection to poll the enterprise system 110. The enterprise system 110 is a centrally located remote enterprise system that is responsible for monitoring and managing the device. This polling mechanism allows the device to query the enterprise system from behind typical intranet security measures 130. The intranet security measures may include firewalls, Internet proxies and Network Address Translators (NATs). A typical polling process will now be discussed in more detail.

The devices 120 may include any number of devices that have a microprocessor. Examples of some devices include, without limitation, copiers, printers, fax machines, and other office machines, machine tools, hospital equipment, or any other device that includes a microprocessor. The microprocessor in each device 120 monitors any number of parameters, such as parameters relating the operation of the device. In the case of office equipment, these parameters may include the current level of consumables or any other condition. Further, the parameters may include information that may be relevant to the manufacturer or customer service provider. In short, any number of desired parameters may be monitored and tracked by the device 120. These parameters may then be logged for communication to the enterprise system 110.

A device 120 automatically and autonomously initiates a polling call at the end of a polling period during normal operating conditions. The polling period during normal operating conditions may be set as desired and may vary from device to device. Examples of polling periods include, without limitation, an hour, several hours, a day, several days, a week, or any other period of time. At the end of each polling period, the device 120 sends a polling call to the enterprise system 110 over an external network, such as the Internet 140 or global computer network. The polling call includes all of the parameters tracked during the polling period. The polling call also includes a request for the enterprise system 110 to return data relevant to the device 120. The device 120 opens a portal through the security measures by sending the polling call to the Internet 140.

The enterprise system 110 receives the polling call from the Internet 140. The enterprise system 110 then stores the parameters and other information sent with the polling call and fulfills any requests included with the polling call.

The enterprise system 110 then formulates a response to the polling call. The response includes any commands, actions, and requests to the device that have been queued up since the last time the device 120 polled the enterprise system 110.

The enterprise system 110 sends the response over the Internet 140 to the device 120 through the security measures 130. The security measures 130 allow the response to pass to the device 120 because the polling call previously sent opened the portal between the device 120 and the enterprise system 110. The device 120 receives the call and processes the information as necessary. The device 120 then again monitors parameters during normal periods of operation and again polls at the end of the normal polling period.

The device 120 is also configured to monitor for fault conditions. Each device 120 may be configured to store one or more threshold value associated with one or more parameter. When one or more threshold values are surpassed, a fault condition exists within the device 120. The device 120 may autonomously initiate an increased polling rate through adaptive device-initiated polling as will be discussed in more detail below.

It may be desirable for the enterprise system 110 to also notify a service technician 150 or customer service agent of the fault condition. The service technician 150 may then use a local computer 160 to access the device 120 via the enterprise system 110. Such a configuration may allow the service technician to diagnose and address the fault condition quickly. Specifically, the length of each polling period is decreased with an increased polling rate because the device sends polling calls more frequently. As a result, the time the service technician waits for responses from the device between polling periods is decreased with an increased polling rate.

Figure 2:
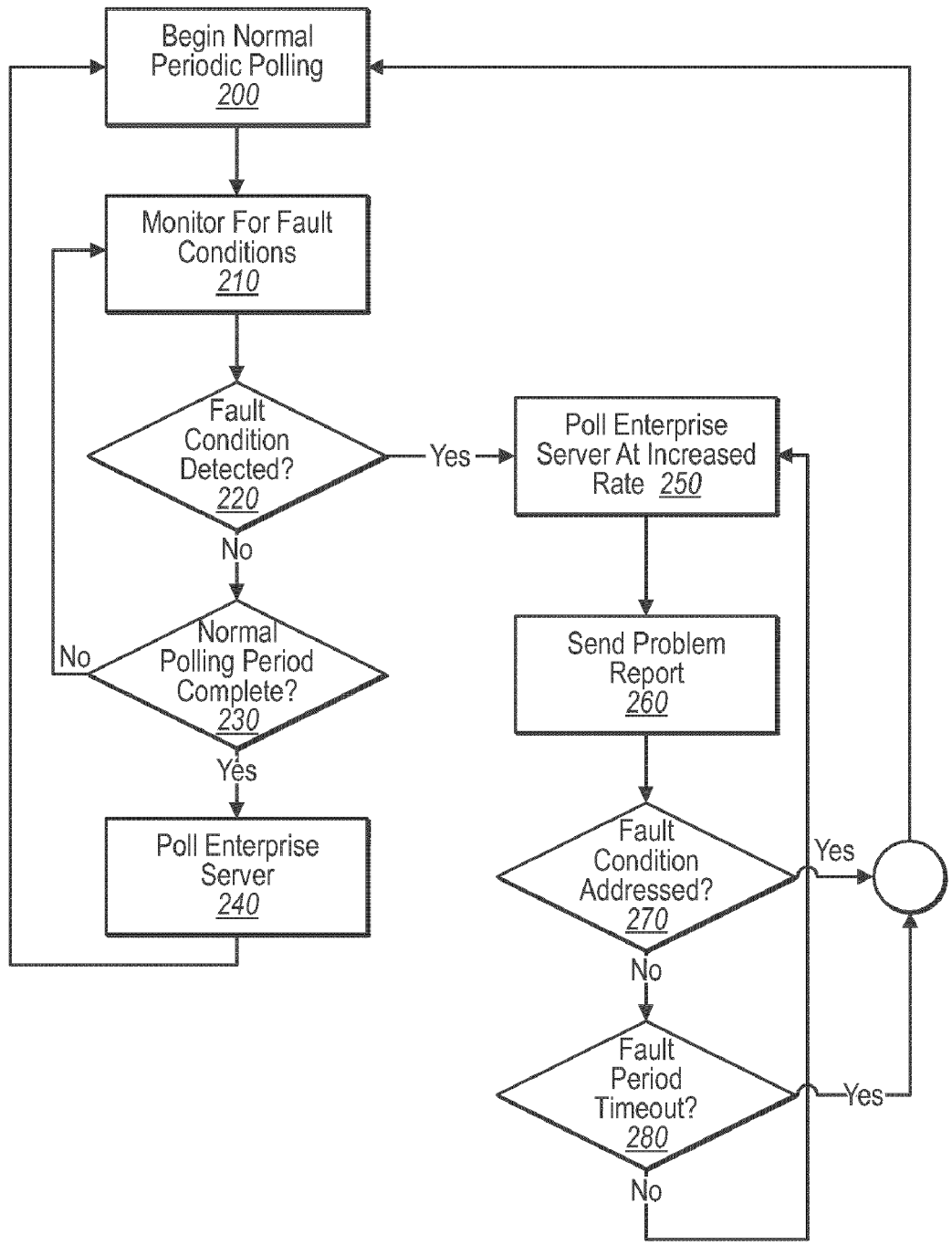
FIG. 2 is a flowchart illustrating a method of performing adaptive device initiated polling according to one example.

FIG. 2 is a flowchart illustrating a process for adaptive device-initiated polling from the perspective of a device. Adaptive device-initiated polling includes normal periodic polling, which begins at 200. Normal periodic polling may include gathering device operating parameters, requests, or any other information to be transmitted with the next polling call.

As depicted at 210 adaptive device-initiated polling also includes monitoring for fault conditions. The device monitors for fault conditions by sensing any number of parameters and then comparing the parameters to any threshold values that may be stored on the device related to the parameters. Not all of the parameters have threshold values. Further, of the parameters that have threshold values, those threshold values may or may not be compared within the device. Those of ordinary skill in the art will appreciate that the comparison of a monitored parameter value to a threshold parameter value may also be performed by the enterprise system.

At 220, the device determines whether a fault condition has occurred. If a fault condition has not been detected (No, 220), at 230, the device then determines whether the normal polling period is complete. If the normal polling period is not complete (No, 230), the device continues to monitor for fault conditions at 210 until the normal polling period is complete. Once the normal polling period is complete, (YES, 230), at 240 the device initiates a polling call to an external enterprise system and the normal periodic polling process begins again.

The normal periodic polling will generally continue so long as no fault condition is detected (No, 220). However, once a fault condition is detected (Yes, 220), at 250 the device then begins to poll the enterprise system at an increased rate relative to the normal periodic polling rate. Any number of fault conditions may be detected that include sensing any number of parameters or actions.

To this point detecting a monitored parameter value that surpasses a corresponding threshold parameter has been discussed as the trigger for a fault condition. In addition, other conditions may trigger a fault condition. For example, if an end user of the device encounters an unexpected problem, the user may be able to externally instigate a fault condition. In particular, the user may indicate through the operator interface of the device that the user needs assistance from the manufacturer's customer support organization. The manual initiation of a service request would then result in the polling rate increase and notification described above. According, receiving a manual request from a user can be considered as detecting a fault condition.

In addition, other external sources may be used to trigger a fault condition. Specifically, a device may be connected to a telephone line, such as through a modem. The device may be configured to poll periodically. A service technician from the device's manufacturer may desire to query the device for some specific parameters without waiting until the end of the polling period for the device to poll the enterprise and receive the request. The device could be configured to adjust its polling rate in response to detecting the telephone ringing to minimize delay. As such, one fault condition may include detecting a telephone ringing with or without answering the call. Once the fault condition is detected, the device may begin polling the enterprise server at an increased rate, such as by using the telephone line to dial out to the enterprise server for a predetermined period.

In addition to polling the enterprise server at an increased rate, at 260 the device also sends a problem report to the enterprise server. The problem report provides notification to the enterprise system that a fault condition has occurred. The problem report may include the actual condition that caused the change in the polling rate. The problem report may also include a screen capture of a visual image of the device's user interface screens at the time of the default condition. Further, the problem report may include information about when and how the fault condition occurred. Such information may allow a technician or other person or machine rendering service to quickly determine which measures to use to remedy the fault condition. By increasing the polling rate and sending a problem report that includes a request for service, a technician is notified of the fault and will be able to perform diagnostics on a device that is polling at a much more responsive rate than the rate used under normal conditions. The increased polling rate may allow the technician to more quickly diagnose and correct the fault condition as the delay between each polling call is decreased.

While increasing the polling rate and sending a problem report are illustrated as separate steps, those of ordinary skill in the art will appreciate that the two steps may occur simultaneously or be part of a single step. When the polling rate is increased, the device begins to log how long the polling rate has been increased. The increased polling period may have a time out period after which the polling rate will be returned to the normal periodic polling rate, as will be discussed below.

Once the device has increased the polling rate and sent the problem report, at 270 the device then determines whether the fault condition has been addressed. The fault condition may be addressed by receiving information back from the enterprise server, such as instructions provided to the enterprise system by a service technician. Additionally, the enterprise system itself may generate instructions to diagnose and correct the fault condition. If the device receives instructions and the instructions correct the fault condition (Yes, 270), the device stops polling at the increased polling rate and again begins periodic polling at 200. Other factors may remedy the fault condition. For example, it may be possible that the device is able to correct the fault condition or that a user on-site at the device's location is able to fix the fault condition. In any case, if the fault condition is addressed, the device returns to normal periodic polling.

If the fault condition is not addressed, at 280 the device then determines whether the fault period has timed out. If the fault period has timed out (Yes, 280), the device may then begin a new normal periodic polling period at 200. Alternatively, when the fault period has timed out (Yes, 280) the device may instead resume a normal periodic polling process midstream, which would poll the enterprise system at the end of the polling period underway when the fault condition was detected.

If the fault period has not timed out (No, 280), the device continues to poll at the increased rate at 250 and to send problem reports at 260 until either the fault condition is addressed at 270 or the fault period times out at 280. Accordingly, the present method provides for relatively low polling rates during periods of inactivity to thus reduce the amount of bandwidth utilizes. The present method also provides for increasing the polling rate of the device when a fault condition is detected. Fault conditions may include detecting that a monitored parameter value has surpassed a threshold parameter value, that a fault action has occurred such as detecting a telephone ringing or receiving an external command to increase a polling rate for a desired duration. Further, the present method allows the device to send a problem report and service request to a technician or other customer service representative. By notifying the technician when the fault condition is detected, the technician may be able to respond quickly to the fault condition. When the technician responds, the device is already polling at an increased rate, thereby reducing the wait time the technician experiences associated with each polling period.

Figure 3:
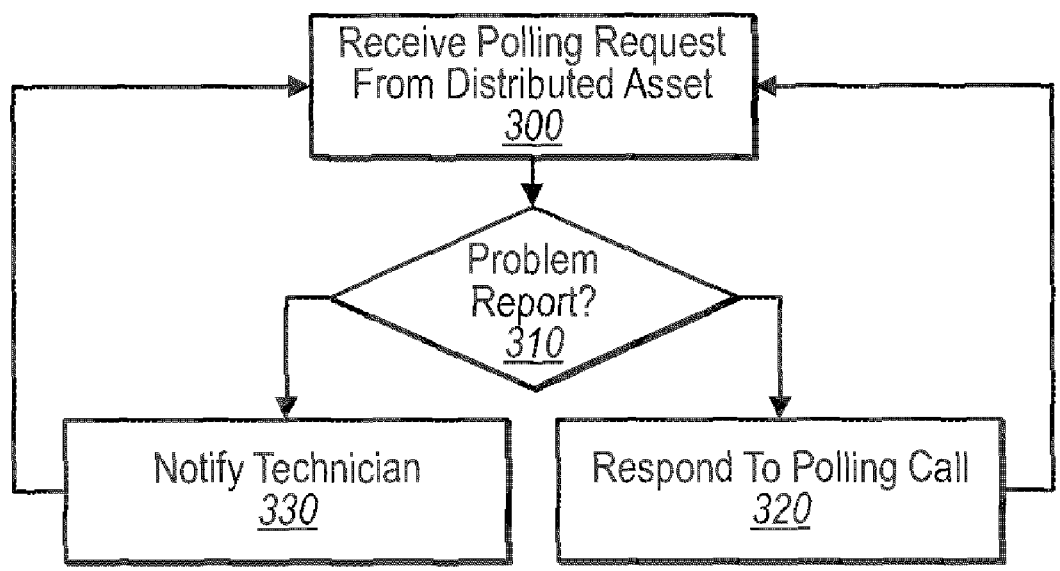
FIG. 3 is a flowchart illustrating a method of managing distributed devices according to one example.

FIG. 3 is a flowchart illustrating a method of managing distributed assets according to one example as seen from the point of view of the enterprise system. The method begins at 300 when the enterprise system receives a polling call from a device. The enterprise system 300 at 310 then determines whether the polling call includes a problem report. If the polling call does not include a problem report (No, 310), the enterprise system at 320 responds to the polling call by returning any commands, actions, and/or requests to the device that have been queued up since the last time the device polled the enterprise system.

If the polling call does include a problem report (Yes, 310), the enterprise system at 330 notifies a service technician and/or customer service agent that a fault condition has been report and the device has requested service. At 340, the enterprise system then receives instructions from the technician and/or customer service, which the enterprise system then includes in responses to the polling calls. The enterprise system itself may be configured to generate instructions to the device in response to receive a problem report. In such an example, the enterprise system would analyze the problem report and automatically respond to the device with instructions to the device, such as instructions to diagnose and/or remedy the fault condition.

In addition, the enterprise system may also be configured to compare monitored parameter information to threshold information to generate a problem report. In such a case, the device would then receive notification that a fault condition existed which would trigger the increased polling rate previously discussed.

In conclusion, a system and method have been discussed herein that provide a mechanism for a remotely monitored device to dynamically adjust the rate at which the device initiates a connection to its enterprise based on condition within the device or through device operator assistance. For example, a device may be configured to normally contact an enterprise system once an hour. However, if a fault condition is detected within or signaled by the device, the polling rate would automatically be adjusted to an increased rate for an increased period. In addition to increasing the polling rate, the device also sends a problem report to the enterprise system. The enterprise system then notifies a service technician and/or customer service agent that a fault condition has occurred and that the device is requesting service.

Embodiments herein may comprise a special purpose or general-purpose computer including various computer hardware, as discussed in greater detail below.

Embodiments may also include computer-readable media for having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a processor associated with a device, the processor and the device being behind a firewall, the method comprising:
    sending polling calls from the processor, through the firewall, to an enterprise system outside the firewall at a first polling rate during normal operating conditions in the device;
    monitoring the device for a fault condition; and
    sending polling calls from the processor, through the firewall, to the enterprise system outside the firewall at a second polling rate in response to detection of a fault condition during the monitoring, the second polling rate being higher than the first polling rate;
    wherein at least some of the polling calls comprises requests for the enterprise system to return data related to the device; and
    wherein the polling calls open communication channels through the firewall, through which the enterprise system can pass the data to the processor.

2. The method of claim 1, further comprising:
    sending a problem report in response to detection of the fault condition;
    wherein service is performed on the device following sending the problem report.

3. The method of claim 1, further comprising:
    sending a problem report in response to detection of the fault condition;
    receiving service instructions generated by the enterprise system in response to sending the problem report; and
    performing service on the device responsive to the service instructions.

4. The method of claim 1, further comprising sending the polling calls at the first polling rate after the fault condition has been corrected.

5. The method of claim 1, further comprising sending the polling calls at the first polling rate after a predetermined period has elapsed, the predetermined period beginning when the fault condition is detected.

6. The method of claim 1, further comprising sending a problem report in response to detection of the fault condition, the problem report comprising an actual condition that triggered the fault condition.

7. The method of claim 1, further comprising sending a problem report in response to detection of the fault condition, the problem report comprising a screen capture of a user interface display associated with the device at a time of the fault condition.

8. The method of claim 1, wherein detecting the fault condition comprises detecting an external input.

9. The method of claim 8, wherein detecting the external input comprises at least one of: detecting a telephone call or receiving input from a user interface associated with the device.

10. The method of claim 1, wherein the polling calls are sent over the Internet.

11. The method of claim 1, further comprising:
    sending a problem report in response to detection of the fault condition;
    receiving service instruction from an external source that is not the enterprise system in response to sending the problem report; and
    performing service on the device in response to the service instructions.

12. A method, performed by a system, of managing a device in a network environment, the method, comprising:

receiving first polling calls from a processor associated with the device, the device and the processor being behind a firewall that separates the device and the processor from the system in the network environment;

identifying a communication from the processor associated with the device that includes a problem report;

notifying a technician that a problem report has been received; and receiving, for a duration, second polling calls from the processor associated with the device, the second polling calls being received by the system after the communication and at a rate that is greater than a rate at which the first polling calls were received by the system;

wherein the first polling calls and the second polling calls pass from the processor associated with the device, through the firewall, to the system;

wherein at least some of the first polling calls and the second polling calls comprises requests for the system to return data related to the device; and wherein the first polling calls and the second polling calls open communication channels through the firewall through which the system can pass requested data to the processor associated with the device.

13. The method of claim 12 further comprising:

comparing monitored parameters included in the first polling calls to threshold parameters; and instructing the processor associated with the device to increase its polling rate if the monitored parameters surpass the threshold parameters.

14. The method of claim 13, wherein instructing is performed via the Internet.

15. The method of claim 12, wherein the polling calls are received via the Internet.

16. A system comprising:

at least one server; and devices configured to communicate with the at least one server, at least some of the devices each comprising a processor that is configured to periodically poll the at least one server at a first polling rate during normal conditions and to automatically poll the at least one server at an increased rate when a fault condition is detected;

wherein, in response to information contained in a polling call for at least one of the devices, the at least one server is configured to automatically notify a service technician that a fault condition has occurred in the at least one device;

wherein the devices and corresponding processors are behind firewalls that separate the at least one server from the devices and corresponding processors in a network environment, and wherein polling calls pass from processors associated with the devices, through respective firewalls, to the at least one server;

wherein at least some of the polling calls comprises requests for the at least one server to return data related to corresponding devices; and wherein the polling calls open communication channels through respective firewalls through which data sent by the at least one server can pass.

17. The system of claim 16, wherein the network environment comprises the Internet, at least some of the devices being on local network separated from the Internet via respective firewalls.

18. The system of claim 16, wherein the at least one server is configured to respond to polls from devices via the Internet.

19. The device of claim 16, wherein a processor in a corresponding device is configured to detect a fault condition in the corresponding device by comparing a monitored value to a threshold value.

20. The device of claim 16, wherein a processor in a corresponding device is configured to detect a fault condition based on an external input to the corresponding device.

21. A computer-readable storage media storing instructions that are executable by a processor associated with a device, the device and the processor being behind a firewall, the instructions to:

send polling calls from the processor, through the firewall, to an enterprise system outside the firewall at a first polling rate during normal operating conditions in the device;

monitor the device for a fault condition; and send polling calls from the processor, through the firewall, to the enterprise system outside the firewall at a second polling rate in response to detection of a fault condition during the monitoring, the second polling rate being higher than the first polling rate;

wherein at least some of the polling calls comprises requests for the enterprise system to return data related to the device; and wherein the polling calls open communication channels through the firewall, through which the enterprise system can pass the data to the processor.

22. The computer-readable storage media of claim 21, further comprising instructions to:

send a problem report in response to detection of the fault condition;

wherein service is performed on the device following sending the problem report.

23. The computer-readable storage media of claim 21, further comprising instructions to:

send a problem report in response to detection of the fault condition;

receive service instructions generated by the enterprise system in response to sending the problem report; and perform service on the device responsive to the service instructions.

24. The computer-readable storage media of claim 21, further comprising instructions to send the polling calls at the first polling rate after the fault condition has been corrected.

25. The computer-readable storage media of claim 21, further comprising instructions to send the polling calls at the first polling rate after a predetermined period has elapsed, the predetermined period beginning when the fault condition is detected.

26. The computer-readable storage media of claim 21, further comprising instructions to send a problem report in response to detection of the fault condition, the problem report comprising an actual condition that triggered the fault condition.

27. The computer-readable storage media of claim 21, further comprising instructions to send a problem report in response to detection of the fault condition, the problem report comprising a screen capture of a user interface display associated with the device at a time of the fault condition.

28. The computer-readable storage media of claim 21, wherein detecting the fault condition comprises detecting an external input.

29. The computer-readable storage media of claim 28, wherein detecting the external input comprises detecting at least one of: detecting a telephone call or receiving input from a user interface associated with the device.

30. The computer-readable storage media of claim 21, wherein the polling calls are sent over the Internet.

31. A computer-readable storage device storing instructions that are executable, by a system, for managing a device in a network environment, the instructions to:
- receive first polling calls from a processor associated with the device, the device and the processor being behind a firewall that separates the device and the processor from the system in the network environment;
- identify a communication from the processor associated with the device that includes a problem report;
- notify a technician that a problem report has been received; and
- receive, for a duration, second polling calls from the processor associated with the device, the second polling calls being received by the system after the communication and at a rate that is greater than a rate at which the first polling calls were received by the system;
- wherein the first polling calls and the second polling calls pass from the processor associated with the device, through the firewall, to the system;
- wherein at least some of the first polling calls and the second polling calls comprises requests for the system to return data related to the device; and
- wherein the first polling calls and the second polling calls open communication channels through the firewall through which the system can pass requested data to the processor associated with the device.

32. The computer-readable storage media of claim 31 further comprising instructions to:
- compare monitored parameters included in the first polling calls to threshold parameters; and
- instruct the processor associated with the device to increase its polling rate if the monitored parameters surpass the threshold parameters.

33. The computer-readable storage media of claim 32, wherein instructing the processor associated with the device is performed via the Internet.

34. The computer-readable storage media of claim 31, wherein the polling calls are received via the Internet.

35. The computer-readable storage media of claim 21, further comprising instructions to:
- send a problem report in response to detection of the fault condition;
- receive service instruction from an external source that is not the enterprise system in response to sending the problem report; and
- perform service on the device in response to the service instructions.

* * * * *

UNITED STATES PATENT AND TRADEMARK OFFICE
CERTIFICATE OF CORRECTION

PATENT NO. : 8,406,119 B2
APPLICATION NO. : 11/537399
DATED : March 26, 2013
INVENTOR(S) : John Louis Taylor It is certified that error appears in the above-identified patent and that said Letters Patent is hereby corrected as shown below:

In the Claims:

Column 10, Line 8, In Claim 21, delete "media" and insert -- device --, therefor.

Column 10, Line 29, In Claim 22, delete "media" and insert -- device --, therefor.

Column 10, Line 35, In Claim 23, delete "media" and insert -- device --, therefor.

Column 10, Line 43, In Claim 24, delete "media" and insert -- device --, therefor.

Column 10, Line 46, In Claim 25, delete "media" and insert -- device --, therefor.

Column 10, Line 51, In Claim 26, delete "media" and insert -- device --, therefor.

Column 10, Line 56, In Claim 27, delete "media" and insert -- device --, therefor.

Column 10, Line 61, In Claim 28, delete "media" and insert -- device --, therefor.

Column 10, Line 64, In Claim 29, delete "media" and insert -- device --, therefor.

Column 11, Line 1, In Claim 30, delete "media" and insert -- device --, therefor.

Column 12, Line 3, In Claim 32, delete "media" and insert -- device --, therefor.

Column 12, Line 10, In Claim 33, delete "media" and insert -- device --, therefor.

Column 12, Line 13, In Claim 34, delete "media" and insert -- device --, therefor.

Column 12, Line 15, In Claim 35, delete "media" and insert -- device --, therefor.

Signed and Sealed this
Ninth Day of July, 2013

Teresa Stanek Rea
*Acting Director of the United States Patent and Trademark Office*